US012122153B2

(12) United States Patent
Landa et al.

(10) Patent No.: US 12,122,153 B2
(45) Date of Patent: Oct. 22, 2024

(54) DIGITAL PRINTING SYSTEM

(71) Applicant: Landa Corporation Ltd., Rehovot (IL)

(72) Inventors: Benzion Landa, Nes Ziona (IL); Nir Zarmi, Be'erotayim (IL); Alon Siman Tov, Or Yehuda (IL); Abraham Keren, Maccabim Reut Modi'in (IL); Yevgeny Zakharin, Petah Tikva (IL); Ulrich Gruetter, Moita Fundeira (PT); Georg Strasser, Bischofszell (CH); Yoav Stein, Kiryat Ono (IL); Ola Reznikov Polsman, Yavne (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

(21) Appl. No.: 18/464,294

(22) Filed: Sep. 11, 2023

(65) Prior Publication Data

US 2023/0415473 A1 Dec. 28, 2023

Related U.S. Application Data

(63) Continuation of application No. 17/312,394, filed as application No. PCT/IB2019/061081 on Dec. 19, 2019, now Pat. No. 11,787,170.

(Continued)

(51) Int. Cl.
*B41J 2/005* (2006.01)
*B41J 11/00* (2006.01)

(Continued)

(52) U.S. Cl.
CPC ....... *B41J 2/0057* (2013.01); *B41J 11/00216* (2021.01); *B41J 2002/012* (2013.01); *B41M 5/0256* (2013.01)

(58) Field of Classification Search
CPC ...... B41J 2/0057; B41J 2/01; B41J 2002/012; B41J 11/007; B41J 15/048;

(Continued)

(56) References Cited

U.S. PATENT DOCUMENTS 11,787,170 B2 10/2023 Landa et al.
2002/0061451 A1* 5/2002 Kita .................. B41M 5/38257 503/227
2022/0379598 A1* 12/2022 Landa .................... B41M 5/025

FOREIGN PATENT DOCUMENTS

JP 2003127480 A 5/2003
JP 2005153525 A 6/2005

(Continued)

*Primary Examiner* — John Zimmermann
(74) *Attorney, Agent, or Firm* — MEITAR PATENTS LTD.

(57) ABSTRACT

A digital printing system includes an intermediate transfer member (ITM), to receive a printing fluid to form an image, a continuous target substrate having opposing first surface and second surface, a light source to illuminate the first surface, and an image sensor to image at least a portion of the light transmitted through the target substrate to the second surface, and a processor. The target substrate configured to engage with the ITM at an engagement point for receiving the image from the ITM, and at the engagement point, the ITM is configured to move at a first velocity and the target substrate is configured to move at a second velocity. The processor is configured to produce a digital image based on the electrical signals, and to estimate, based on the digital image, at least a distortion in the image.

20 Claims, 6 Drawing Sheets

Related U.S. Application Data

(60) Provisional application No. 62/784,576, filed on Dec. 24, 2018, provisional application No. 62/784,579, filed on Dec. 24, 2018.

(51) Int. Cl.
*B41J 2/01* (2006.01)
*B41M 5/025* (2006.01)

(58) Field of Classification Search
CPC ....... G03G 15/1615; G03G 2215/1623; B41M 2205/10; B41M 5/0256
See application file for complete search history.

(56) References Cited

FOREIGN PATENT DOCUMENTS

| | | |
|---|---|---|
| JP | 2015515394 A | 5/2015 |
| JP | 2018144435 A | 9/2018 |

* cited by examiner

DIGITAL PRINTING SYSTEM

CROSS-REFERENCE TO RELATED APPLICATIONS

This application is a continuation application of U.S. patent application Ser. No. 17/312,394 filed Jun. 10, 2021, which is a U.S. National Phase of PCT Application PCT/IB2019/061081, which claims the benefit of U.S. Provisional Patent Applications 62/784,576 and 62/784,579, both filed Dec. 24, 2018. The disclosures of these related applications are incorporated herein by reference.

FIELD OF THE INVENTION

The present invention relates generally to digital printing, and particularly to methods and systems for digital printing on continuous substrates.

BACKGROUND OF THE INVENTION

In various applications, such as in producing labels and plastic bags, printing of images on a suitable continuous media is required. Moreover, various methods have been developed for monitoring and reducing distortions, and in particular geometric distortions, in digital printing.

For example, U.S. Patent Application Publication 2002/0149771 describes an inspection device comprising an inspection light projector and an auxiliary light emitter respectively project an inspection light and auxiliary light onto a position of a filmstrip. After transmitting the filmstrip, the inspection light is received by a defect detector. When receiving the inspection light, the defect detector generates a data signal and sends it to a controller. In the controller, a threshold of a level of the data signal is memorized, and the level of the data signal is compared with the threshold. If the level of the data signal becomes under the threshold, the controller determines that the filmstrip has a coloring defect.

U.S. Patent Application Publication 2010/0165333 describes a method and device for inspecting a laminated film. The method comprises a first inspection process of inspecting presence of a defect on a front surface of a film body with a protective film separated therefrom. The method further comprises a second inspection process of inspecting presence of the defect in the film body in a vertical attitude while introducing the film body with the separator separated and removed therefrom to a film travel path directed in a vertical direction, and storing detection data.

U.S. Pat. No. 5,969,372 describes a method and apparatus for detecting surface defects and artifacts on a transmissive image in an optical image scanner and correcting the resulting scanned image. In one scan, the image is scanned normally. Surface defects and artifacts such as dust, scratches and finger prints are detected by providing a separate scan using infrared light or by measuring light (white or infrared) that is scattered or diffracted by the defects and artifacts.

SUMMARY OF THE INVENTION

An embodiment of the present invention that is described herein provides a digital printing system, including an intermediate transfer member (ITM), which is configured to receive a printing fluid so as to form an image, a continuous target substrate, and a processor. The continuous target substrate is configured to engage with the ITM at an engagement point for receiving the image from the ITM, at the engagement point, the ITM is configured to move at a first velocity and the continuous target substrate is configured to move at a second velocity. The processor is configured to match the first velocity and the second velocity at the engagement point.

In some embodiments, the printing fluid includes ink droplets received from an ink supply system to form the image thereon. In other embodiments, the system includes first and second drums, the first drum is configured to rotate at a first direction and first rotational velocity so as to move the ITM at the first velocity, and the second drum is configured to rotate at a second direction and at a second rotational velocity so as to move the continuous target substrate at the second velocity, and the processor is configured to engage and disengage between the ITM and the continuous target substrate at the engagement point by displacing one or both of the first drum and the second drum. In yet other embodiments, the processor is configured to receive an electrical signal indicative of a difference between the first and second velocities, and, based on the electrical signal, to match the first and second velocities.

In an embodiment, the processor is configured to set at least one operation selected from a list consisting of (a) timing of engagement and disengagement between the first and second drums, (b) a motion profile of at least one of the first and second drums, and (c) a size of a gap between the disengaged first and second drums. In another embodiment, the system includes an electrical motor configured to move one or both of the ITM and the target substrate, the processor is configured to receive a signal indicative of a temporal variation in an electrical current flowing through the electrical motor, and to match the first velocity and the second velocity responsively to the signal. In yet another embodiment, the processor is configured to match the first velocity and the second velocity by reducing the temporal variation in the electrical current.

In some embodiments, the temporal variation includes a slope of the electrical current as a function of time, across a predefined time interval. In other embodiments, the processor is configured to compensate for a thermal expansion of at least one of the first and second drums by reducing the temporal variation in the electrical current. In yet other embodiments, the continuous target substrate includes a first substrate having a first thickness, or a second substrate having a second thickness, different from the first thickness, and the processor is configured to compensate for the difference between the first thickness and the second thickness by reducing the temporal variation in the electrical current.

In an embodiment, the ITM is formed of a loop that is closed by a seam section, and the processor is configured to prevent physical contact between the seam section and the continuous target substrate, by: (a) causing temporary disengagement between the ITM and the continuous target substrate during time intervals in which the seam section traverses the engagement point, and (b) backtracking the continuous target substrate during the time intervals, so as to compensate for the temporary disengagement. In another embodiment, the system includes a backtracking mechanism, which is configured to backtrack the continuous target substrate, and which includes at least first and second displaceable rollers having a physical contact with the continuous target substrate and configured to backtrack the continuous target substrate by moving the rollers relative to one another. In yet another embodiment, the ITM includes a stack of multiple layers and having one or more markers engraved in at least one of the layers, at one or more respective marking locations along the ITM.

In some embodiments, the system includes one or more sensing assemblies disposed at one or more respective predefined locations relative to the ITM, the sensing assemblies are configured to produce signals indicative of respective positions of the markers. In other embodiments, the processor is configured to receive the signals, and, based on the signals, to control a deposition of the ink droplets on the ITM. In yet other embodiments, the system includes at least one station or assembly, the processor is configured, based on the signals, to control an operation of the at least one station or assembly of the system.

In an embodiment, the at least one station or assembly is selected from a list consisting of (a) an image forming station, (b) an impression station, (c) an ITM guiding system, (d) one or more drying assemblies, (e) an ITM treatment station, and (f) an image quality control station. In another embodiment, the system includes an image forming module, which is configured to apply a substance to the ITM.

In some embodiments, the substance includes at least a portion of the printing fluid. In other embodiments, the image forming module includes a rotogravure printing apparatus.

There is additionally provided, in accordance with an embodiment of the present invention, a method, including receiving a printing fluid on an intermediate transfer member (ITM), so as to form an image. A continuous target substrate is engaged with the ITM at an engagement point for receiving the image from the ITM, and, at the engagement point, the ITM is moved at a first velocity and the continuous target substrate is moved at a second velocity. The first velocity and the second velocity are matched at the engagement point.

There is further provided, in accordance with an embodiment of the present invention, a digital printing system that includes an intermediate transfer member (ITM), a light source, an image sensor assembly, and a processor. The ITM is configured to receive a printing fluid so as to form an image, and to engage with a target substrate having opposing first and second surfaces, so as to transfer the image to the target substrate. The light source is configured to illuminate the first surface of the target substrate with light. The image sensor assembly is configured to image at least a portion of the light transmitted through the target substrate to the second surface, and to produce electrical signals in response to the imaged light. The processor is configured to produce a digital image based on the electrical signals, and to estimate, based on the digital image, at least a distortion in the printed image.

In some embodiments, the target substrate includes a continuous target substrate. In other embodiments, the distortion includes a geometric distortion. In yet other embodiments, the processor is configured to estimate the distortion by analyzing one or more marks on the target substrate.

In an embodiment, at least one of the marks includes a barcode. In another embodiment, the light source includes a light diffuser. In another embodiment, the light source includes at least a light emitting diode (LED). In yet another embodiment, the system includes one or more motion assemblies, which are configured to move at least one of the target substrate and the image sensor assembly relative to one another, the processor is configured to produce the digital image by controlling the one or more motion assemblies.

In some embodiment, the processor is configured to use at least one of the one or more motion assemblies so as to position, between the light source and the image sensor assembly, a mark formed on the target substrate. In other embodiments, the motion assemblies include first and second motion assemblies, and the processor is configured to (i) move only one of the first and second motion assemblies at a time and (ii) move the first and second motion assemblies simultaneously. In yet other embodiments, the processor is configured to estimate at least the distortion in the image during production of the printed image.

In an embodiment, the processor is configured to estimate at least a density of the printing fluid, by analyzing an intensity of the light transmitted through the target substrate to the second surface. In another embodiment, the printing fluid includes white ink. In yet another embodiment, the electrical signals are indicative of the intensity, and the processor is configured to produce, in the digital image, gray levels indicative of the intensity.

There is additionally provided, in accordance with an embodiment of the present invention, a method, including in a digital printing system, receiving by an intermediate transfer member (ITM) a printing fluid so as to form an image, and engaging with a target substrate having opposing first and second surfaces so as to transfer the image to the target substrate. Using a light source, the first surface of the target substrate is illuminated with light. Using an image sensor assembly, at least a portion of the light transmitted through the target substrate is imaged to the second surface, and electrical signals are produced in response to the imaged light. A digital image is produced based on the electrical signals, and, based on the digital image, at least a distortion in the printed image is estimated.

The present invention will be more fully understood from the following detailed description of the embodiments thereof, taken together with the drawings in which:

DETAILED DESCRIPTION OF EMBODIMENTS

Overview

Figure 1A:
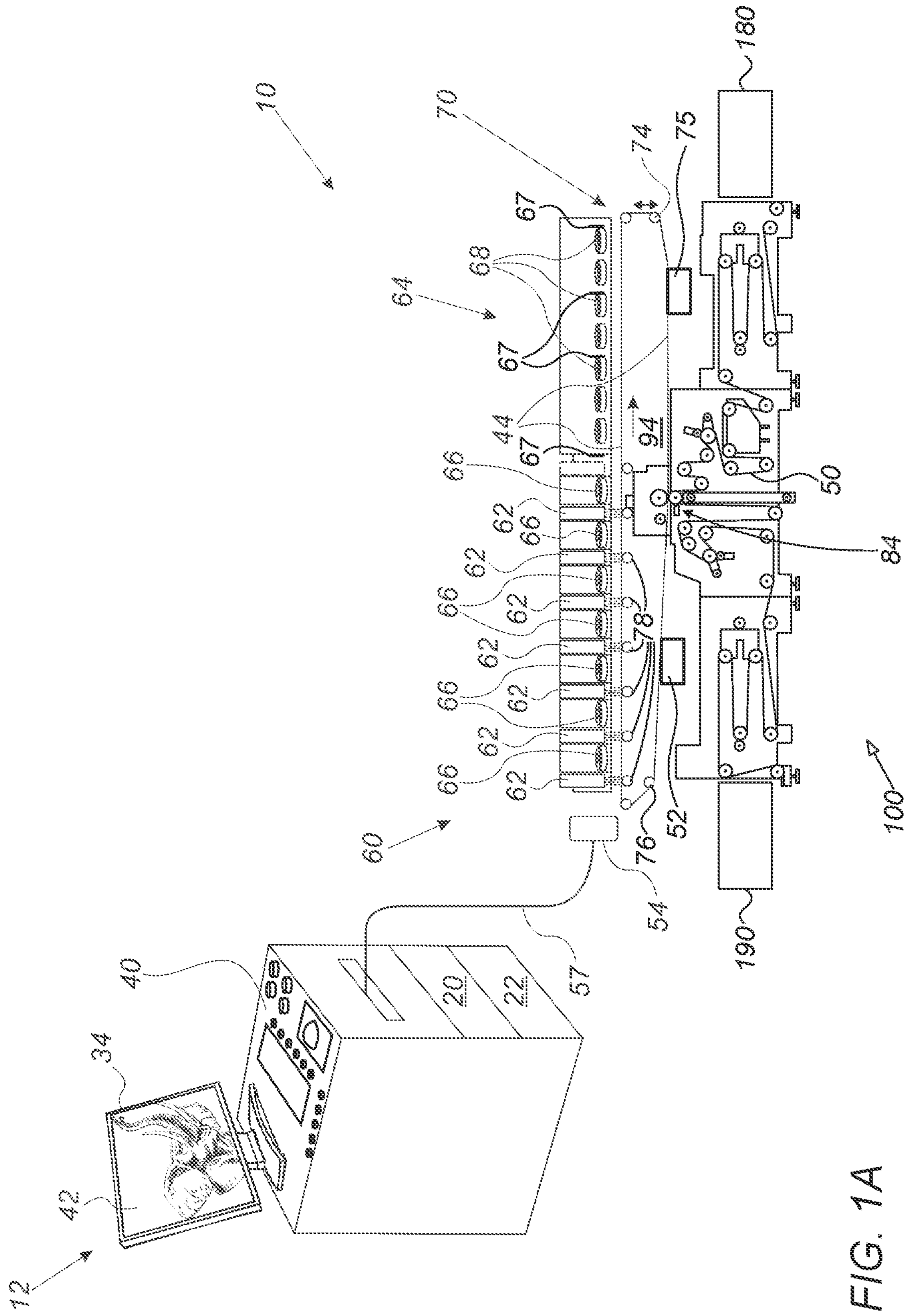
FIG. 1A is a schematic side view of a digital printing system, in accordance with an embodiment of the present invention.

Embodiments of the present invention that are described hereinbelow provide methods and apparatus for digital printing on a continuous substrate. In some embodiments, a digital printing system comprises a flexible intermediate transfer member (ITM) configured to receive an image formed by laying printing fluid, such as an aqueous ink on the ITM, and a target substrate, which is configured to engage with the ITM at an engagement point for receiving the image from the ITM. At the engagement point, the ITM and the substrate are moved at first and second velocities, respectively.

In some embodiments, the digital printing system further comprises an impression station comprising an impression cylinder, which is configured to move the target substrate at the first velocity and a pressure cylinder, which is configured to move the ITM at the second velocity.

In some embodiments, the digital printing system further comprises a processor, which is configured to engage and disengage between the ITM and the substrate at the engagement point by displacing at least the impression cylinder, and to match the first and second velocities at the engagement point so as to transfer the ink from the ITM to the substrate.

In some embodiments, the ITM is formed of a loop that is closed by a seam section, and the processor is configured to prevent undesired physical contact between the seam section and the substrate by (a) causing temporary disengagement between the ITM and the continuous target substrate during time intervals in which the seam section traverses the engagement point, and (b) backtracking the continuous target substrate during these time intervals, so as to compensate for the temporary disengagement.

In some embodiments, the digital printing system comprises an electrical motor, which is configured to move one of the ITM and the target substrate, or both. In these embodiments, the processor is configured to receive a signal indicative of a temporal variation in an electrical current flowing through the electrical motor, and, based on the signal, to match the first and second velocities, e.g., by reducing the temporal variation in the electrical current.

In some cases, the printing system and/or printing process may have variations caused, for example, by a thermal expansion of one or more cylinders of the impression station, or by a thickness change of the substrate. In some embodiments, based on the aforementioned received signal, the processor is configured to compensate for such (and other) variations by reducing the temporal variation in the electrical current flowing through the electrical motor.

The disclosed techniques improve the accuracy, quality and productivity of digital printing on a continuous substrate by compensating for a large variety of system and process variations. Moreover, the disclosed techniques reduce possible waste of substrate real estate by preventing physical contact between the seam and the substrate, and by backtracking the continuous substrate so as to minimize margins between adjacent printed images.

Polymer-based substrates in the form of continuous web are used in various applications of flexible packaging, such as in food packaging, plastic bags and tubes. In some cases, the process of printing an image on such substrates may cause distortions, such as geometrical distortions and other defects in the printed image. In principle, such distortions can be detected, for example, using reflection-based optical inspection methods. High reflectivity of the substrate applied thereto, however, as well as other noise sources, such as wrinkles in the substrate, may interfere with an underlying distortion-indicative inspection signal, and reduce the detection rate and accuracy. For example, the high reflectivity of the substrate may cause non-uniform contrast and local saturation across the field-of-view (FOV) of an image acquired by an optical inspection apparatus, which may reduce the detection rate of defects of interest.

Other embodiments of the present invention provide methods and systems for detecting defects, such as geometrical distortions, in digital printing on the continuous substrate. In some of these embodiments, the digital printing system comprises the ITM configured to receive the image formed by laying printing fluid, such as the aforementioned aqueous ink on the ITM. The digital printing system prints the image on the continuous target substrate having opposing upper and lower surfaces. The target substrate is configured to engage with the ITM for receiving the image from the ITM. The image printed on the target substrate typically comprises a base-layer made from white ink, and a pattern printed on the base-layer using one or more other colors of ink.

In some embodiments, the image printed on the target is subject to inspection for detecting defects. To perform defect detection, the digital printing system further comprises a light source, which is configured to illuminate one surface (e.g., a lower surface) of the target substrate with a suitable beam of light. The digital printing system further comprises an image sensor assembly, which is configured to sense the light beam transmitted through the target substrate to the opposite surface (e.g., an upper surface), and to produce electrical signals in response to the sensed light. In some embodiments, the image sensor assembly is configured to detect the intensity of the transmitted light that passed through the target substrate, base-layer and ink pattern. For example, since the white ink is partially transparent to the emitted light, the intensity of the detected light, and therefore also the electrical signals produced by the image sensor assembly, depend on the densities and/or thicknesses of the layer of the white ink.

In some embodiments, the processor of the digital printing system is configured to produce a digital image based on the electrical signals received from the image sensor assembly. For example, the processor is configured to produce a digital color image having, for each color, similar or different toning at different locations of the digital image.

In some embodiments, the image sensor assembly comprises a color camera having red, green and blue (RGB) channels. In the context of the present disclosure and in the claims, the term "gray level" in color images, refers to a scale indicative of the brightness level of the colors of the digital images. In the camera having the RGB channels, each channel has a scale of gray levels. For example, in an image of the green channel, which comprises two areas having respective gray levels of 100 and 200, the area with gray level 200 will have a green color brighter than the area with gray level 100.

In alternative embodiments, the image sensor assembly may comprise a monochromatic camera having only black, white and gray colors. In these embodiments, the term "gray levels" represents a scale indicative of the level of brightness only between black and white. The actual gray levels in the digital image depend on the density of the ink applied to respective locations of the target substrate. In some embodiments, the processor is further configured to process the digital image for detecting geometric distortions and other defects in the printed image.

In some embodiments, the target substrate may comprise various types of test features, also referred to herein as test targets printed on the upper surface, each test target can be used for checking the status of a component of the digital system. For example, a given test target may be used for monitoring a specific nozzle in a print bar of the digital printing system, to check whether the nozzle is functional or blocked. The processor is configured to position the test target between the light source and the image sensor assembly, to acquire one or more digital images of the test target, and to analyze the acquired images so as to determine the status of the nozzle in question. The processor is further configured to compensate for at least some types of malfunctions that are detected using the test targets, e.g., by reorganizing the printing process.

The disclosed techniques improve the quality of printing on flexible packages, by various types of defects, which are not detectable or having low detection rate using other (e.g., reflection-based) optical inspection methods. Using the disclosed test targets and testing schemes assists in identifying and compensating for malfunctions occurring in the digital printing process that cause these defects. Moreover, the disclosed techniques reduce the amount of plastic waste caused by scrapped substrate and ink.

System Description

FIG. 1A is a schematic side view of a digital printing system 10, in accordance with an embodiment of the present invention. In some embodiments, system 10 comprises a rolling flexible ITM 44 that cycles through an image forming station 60, a drying station 64, an impression station 84 and a blanket treatment station 52 (also referred to herein as an ITM treatment station). In the context of the present invention and in the claims, the terms "blanket" and "intermediate transfer member (ITM)" are used interchangeably and refer to a flexible member comprising one or more layers used as an intermediate member configured to receive an ink image and to transfer the ink image to a continuous target substrate 50, as will be described in detail below.

ITM 44 is further described in detail, for example, in PCT Patent Applications PCT/IB2017/053167, PCT/IB2019/055288, and PCT/IB2019/055288, whose disclosures are all incorporated herein by reference.

Figure 1B:
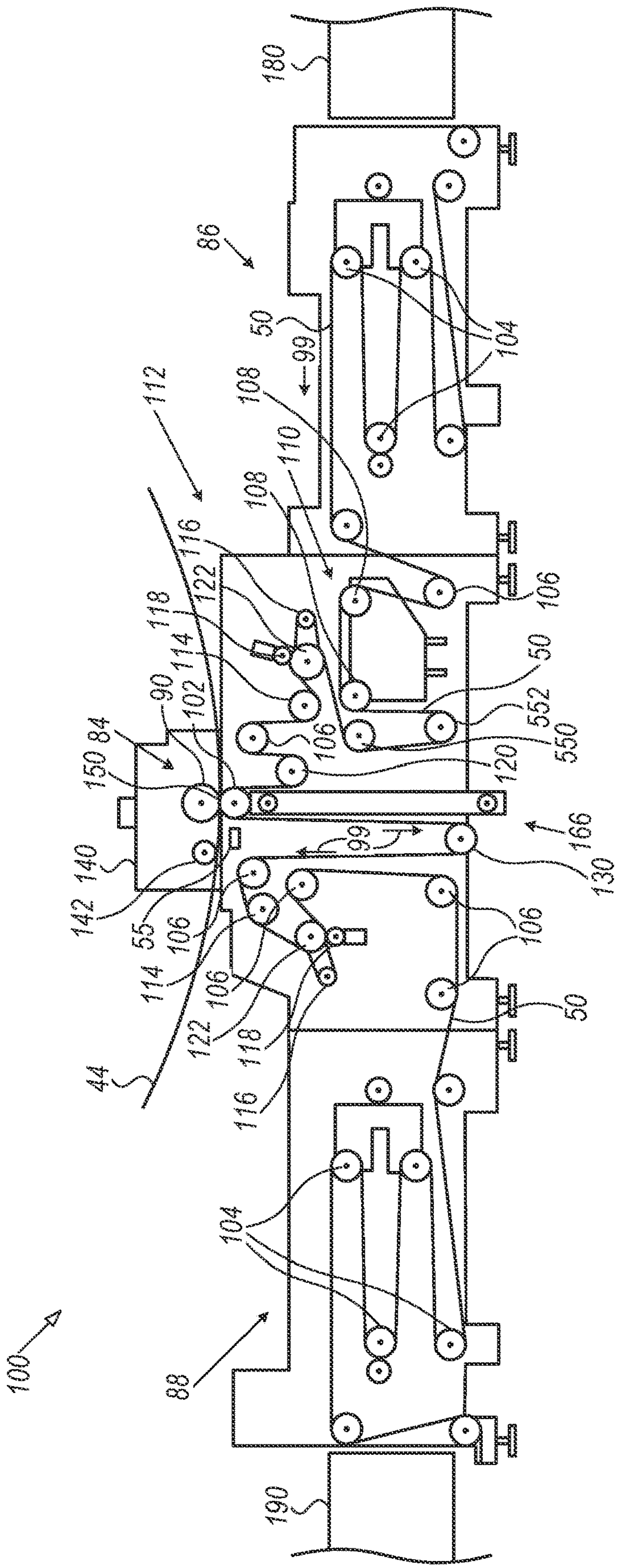
FIG. 1B is a schematic side view of a substrate transport module, in accordance with an embodiment of the present invention.

FIG. 1B is a schematic side view of a substrate transport module 100 of system 10, in accordance with an embodiment of the present invention.

In an operative mode, image forming station 60 is configured to form a mirror ink image, also referred to herein as "an ink image" (not shown), of a digital image 42 on an upper run of a surface of ITM 44, such as on a blanket release layer or on any other suitable layer of ITM 44. Subsequently the ink image is transferred to continuous target substrate 50 located under a lower run of ITM 44. In some embodiments, continuous target substrate 50 comprises a continuous ("web") substrate made from one or more layers of any suitable material, such as an aluminum foil, a paper, polyester, polyethylene terephthalate (PET), biaxially oriented polypropylene (BOPP), biaxially oriented polyamide (BOPA), other types of oriented polypropylene (OPP), a shrinked film also referred to herein as a polymer plastic film, or any other materials suitable for flexible packaging in a form of continuous web, or any suitable combination thereof, e.g., in a multilayered structure. Continuous target substrate 50 may be used in various applications, such as but not limited to food packaging, plastic bags and tubes, labels, decoration and flooring.

In the context of the present invention, the term "run" refers to a length or segment of ITM 44 between any two given rollers over which ITM 44 is guided.

In some embodiments, during installation ITM 44 may be adhered edge to edge, referred to herein as a seam section (not shown), to form a continuous blanket loop. An example of a method and a system for the formation of the seam section is described in detail in PCT Patent Publication WO 2016/166690 and in PCT Patent Publication WO 2019/012456, whose disclosures are all incorporated herein by reference.

In some embodiments, system 10 is configured to synchronize between ITM 44 and image forming station 60 such that no ink image is printed on the seam. In other embodiments, a processor 20 of system 10 is configured to prevent physical contact between the seam section and continuous target substrate 50 as will be described in detail in FIG. 2 below.

In alternative embodiments, ITM 44 may comprise a coupling section for attaching the ends of the blanket (not shown), such as the aforementioned seam or any other configuration using any other technique for coupling the ends of ITM 44. In these embodiments, at least part of the ink image and/or at least part of any type of testing features may be printed on the coupling section.

In some embodiments, image forming station 60 typically comprises multiple print bars 62, each mounted (e.g., using a slider) on a frame (not shown) positioned at a fixed height above the surface of the upper run of ITM 44. In some embodiments, each print bar 62 comprises a plurality of print heads arranged so as to cover the width of the printing area on ITM 44 and comprises individually controllable print nozzles.

In some embodiments, image forming station 60 may comprise any suitable number of print bars 62, each print bar 62 may contain a printing fluid, such as an aqueous ink of a different color. The ink typically has visible colors, such as but not limited to cyan, magenta, red, green, blue, yellow, black and white. In the example of FIG. 1A, image forming station 60 comprises seven print bars 62, but may comprise, for example, four print bars 62 having any selected colors such as cyan, magenta, yellow and black.

In some embodiments, the print heads are configured to jet ink droplets of the different colors onto the surface of ITM 44 so as to form the ink image (not shown) on the surface of ITM 44. In some embodiments, system 10 may comprise an image forming module (not shown) in addition to the aforementioned image forming station. The image forming module is configured to apply at least one of the colors (e.g., white) to the surface of ITM 44 using any suitable technique. For example, the image forming module may comprise a rotogravure printing apparatus (not shown), which comprises a set of engraved rollers, e.g., an anilox roll and/or any other suitable type of one or more rollers, configured to apply the printing fluid (e.g., ink), or a primer or any other type of substance to the surface of ITM 44. In some embodiments, the rotogravure printing apparatus may be coupled to system 10 as will be described below. In other embodiments, any other suitable type of printing apparatus may be coupled to system 10 for applying one or more substances to continuous target substrate 50.

In some embodiments, different print bars 62 are spaced from one another along the movement axis of ITM 44, represented by an arrow 94. In this configuration, accurate spacing between bars 62, and synchronization between directing the droplets of the ink of each bar 62 and moving ITM 44 are essential for enabling correct placement of the image pattern.

In some embodiments, system 10 comprises dryers, such as, but not limited to, infrared-based dryers (depicted in detail in FIG. 5 below) configured to emit infrared radiation, and/or hot gas or air blowers 66. Note that image forming station 60 may comprise any suitable combination of print bars 62 and ink dryers, such as blowers 66 and the aforementioned infrared-based dryers. These dryers are positioned in between print bars 62, and are configured to partially dry the ink droplets deposited on the surface of ITM 44.

Figure 5:
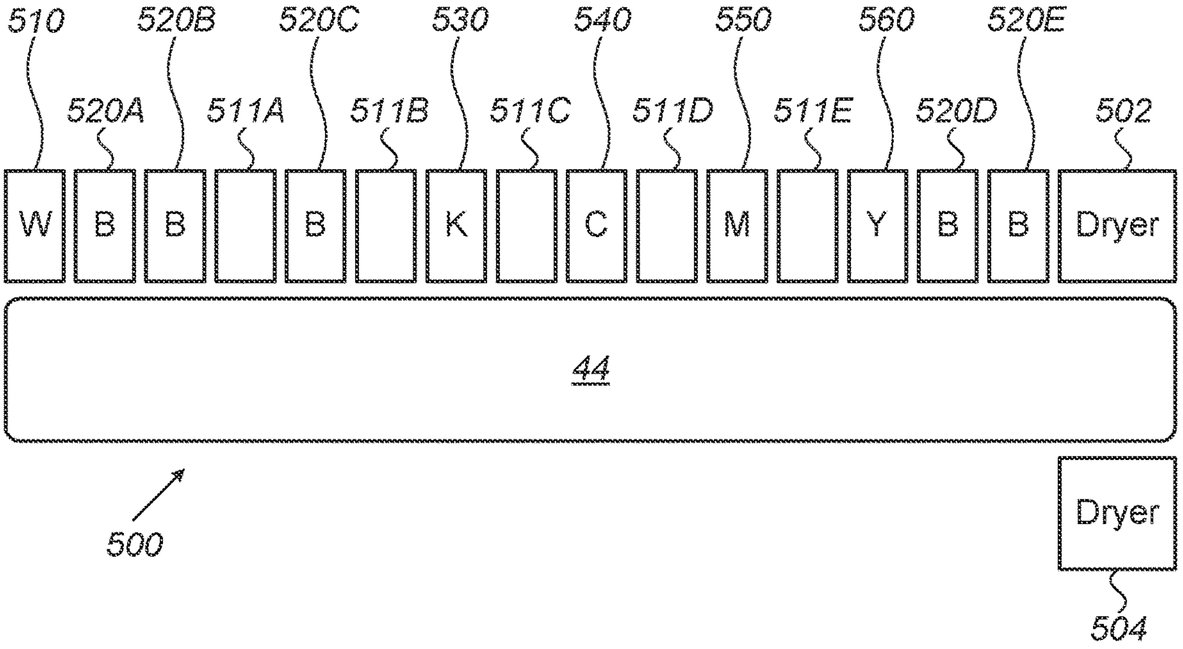
FIG. 5 is a schematic side view of an image forming station and multiple drying stations that are part of a digital printing system, in accordance with an embodiment of the present invention.

In some embodiments, station 60 may comprise one or more blowers 66 and/or one or more infrared-based dryers (or any other type of dryers) between at least two neighbor print bars 62, an example configuration of these embodiments is shown in FIG. 5 below, but in other embodiments, station 60 may comprise any other suitable configuration. This hot air flow and/or infrared radiation between the print bars may assist, for example, in reducing condensation at the surface of the print heads and/or in handling satellites (e.g., residues or small droplets distributed around the main ink droplet), and/or in preventing blockage of the inkjet nozzles of the print heads, and/or in preventing the droplets of different color inks on ITM 44 from undesirably merging into one another.

In some embodiments, drying station 64 is configured to dry the ink image applied to the surface of ITM 44, e.g., from solvents and/or water, such as blowing on the surface hot air (or another gas), and/or irradiating the surface of ITM 44 using infrared or any other suitable radiation. Using these, or any other suitable, drying techniques make the ink image tacky, thereby allowing complete and appropriate transfer of the ink image from ITM 44 to continuous target substrate 50.

In an example embodiment, drying station 64 may comprise air blowers 68 configured to blow hot air and/or gas, and/or any other suitable drying apparatus. In the example of FIG. 1A, drying station 64 further comprises one or more infrared driers (IRD) 67 configured to emit infrared radiation on the surface of ITM 44. In drying station 64, the ink image formed on ITM 44 is exposed to radiation and/or to hot air in order to dry the ink more thoroughly, evaporating most or all of the liquid carrier and leaving behind only a layer of resin and coloring agent which is heated to the point of being rendered tacky ink film.

Additionally or alternatively, system 10 may comprise a drying station 75, which is configured to emit infrared light or any other suitable frequency, or range of frequencies, of light for drying the ink image formed on ITM 44 using the technique described above.

Note that system 10 may comprise a single type of one or more suitable drying stations, e.g., blower-based or radiation-based, or a combination of multiple drying techniques integrated with one another, as shown, for example, in station 64. Each dryer of stations 64 and 75 may be operated selectively, based on the type and order of colors applied to the surface of ITM 44, and based on the type of ITM 44 and continuous target substrate 50.

In some embodiments, system 10 comprises a blanket module 70, also referred to herein as an ITM guiding system, comprising a rolling ITM, such as ITM 44. In some embodiments, blanket module 70 comprises one or more rollers 78, wherein at least one of rollers 78 comprises an encoder (not shown), which is configured to record the position of ITM 44, so as to control the position of a section of ITM 44 relative to a respective print bar 62. In some embodiments, the encoder of roller 78 typically comprises a rotary encoder configured to produce rotary-based position signals indicative of an angular displacement of the respective roller.

Additionally or alternatively, ITM 44 may comprise an integrated encoder (not shown), which comprises one or more markers embedded in one or more layers of ITM 44. In some embodiments, the integrated encoder may be used for controlling the operation of various modules of system 10.

In some embodiments, system 10 may comprise one or more sensing assemblies (not shown) disposed at one or more respective predefined locations adjacent to ITM 44. The sensing assemblies are configured to produce, in response to sensing the markers, electrical signals, such as position signals indicative of respective positions of the markers.

In some embodiments, the signals received from the sensing assemblies may be used for controlling processes of impression station 84, for example, for controlling the timing of the engagement and disengagement of cylinders 90 and 102 and their respective motion profiles, for controlling a size of a gap between cylinders 90 and 102, for synchronizing the operation of impression station 84 with respect to the location of the blanket seam, and for controlling any other suitable operation of station 84.

In some embodiments, the signals received from the sensing assemblies may be used for controlling the operation of blanket treatment station 52 such as for controlling the cleaning process, and/or the application of the treatment liquid to ITM 44, and for controlling every other aspect of the blanket treatment process.

Moreover, the signals received from the sensing assemblies may be used for controlling the operation of all the rollers and dancers of system 10, each roller individually and synchronized with one another, to control any sub-system of system 10 that controls temperature aspects, and heat exchanging aspects of the operation of system 10. In some embodiments, the signals received from the sensing assemblies may be used for controlling the blanket imaging operations of system 10. For example, based on data obtained from an image quality control station (shown in FIG. 6 below) configured to acquire digital images of the image printed on the target substrate, for controlling the operation of any other component of system 10.

The integrated encoder is described in detail, for example, in the aforementioned U.S. Provisional Application 62/689,852, whose disclosure is incorporated herein by reference.

In some embodiments, ITM 44 is guided over rollers 76 and 78 and a powered tensioning roller, also referred to herein as a dancer 74. Dancer 74 is configured to control the length of slack in ITM 44 and its movement is schematically represented by a double sided arrow. Furthermore, any stretching of ITM 44 during the printing process and/or due to aging would not affect the ink image placement performance of system 10 and would merely require the taking up of more slack by tensioning dancer 74.

In some embodiments, dancer 74 may be motorized. The configuration and operation of rollers 76 and 78, and dancer 74 are described in further detail, for example, in U.S. Patent Application Publication 2017/0008272 and in the above-mentioned PCT International Publication WO 2013/132424, whose disclosures are all incorporated herein by reference.

In impression station 84, ITM 44 passes between an impression cylinder 102 and a pressure cylinder 90, which is configured to carry a compressible blanket wrapped thereabout. In the context of the present invention and in the claims, the terms "cylinder" and "drum" are used interchangeably and refer to impression cylinder 102 and pressure cylinder 90 of impression station 84.

In some embodiments, system 10 comprises a control console 12, which is configured to control multiple modules of system 10, such as blanket module 70, image forming station 60 located above blanket module 70, and substrate transport module 100, located below blanket module 70.

In some embodiments, console 12 comprises processor 20, typically a general-purpose computer, with suitable front end and interface circuits for interfacing with a controller 54, via a cable 57, and for receiving signals therefrom. In some embodiments, controller 54, which is schematically shown as a single device, may comprise one or more electronic modules mounted on system 10 at predefined locations. At least one of the electronic modules of controller 54 may comprise an electronic device, such as control circuitry or a processor (not shown), which is configured to control various modules and stations of system 10. In some embodiments, processor 20 and the control circuitry may be programmed in software to carry out the functions that are used by the printing system, and store data for the software in a memory 22. The software may be downloaded to processor 20 and to the control circuitry in electronic form, over a network, for example, or it may be provided on non-transitory tangible media, such as optical, magnetic or electronic memory media.

In some embodiments, console 12 comprises a display 34, which is configured to display data and images received from processor 20, or inputs inserted by a user (not shown) using input devices 40. In some embodiments, console 12 may have any other suitable configuration, for example, an alternative configuration of console 12 and display 34 is described in detail in U.S. Pat. No. 9,229,664, whose disclosure is incorporated herein by reference.

In some embodiments, processor 20 is configured to display on display 34, a digital image 42 comprising one or more segments (not shown) of image 42 and various types of test patterns stored in memory 22.

In some embodiments, blanket treatment station 52, also referred to herein as a cooling station, is configured to treat the blanket by, for example, cooling it and/or applying a treatment fluid to the outer surface of ITM 44, and/or cleaning the outer surface of ITM 44. At blanket treatment station 52 the temperature of ITM 44 can be reduced to a desired value before ITM 44 enters image forming station 60. The treatment may be carried out by passing ITM 44 over one or more rollers and/or blades configured for applying cooling and/or cleaning and/or treatment fluid on the outer surface of the blanket. In some embodiments, processor 20 is configured to receive, e.g., from temperature sensors (not shown), signals indicative of the surface temperature of ITM 44, so as to monitor the temperature of ITM 44 and to control the operation of blanket treatment station 52. Examples of such treatment stations are described, for example, in PCT International Publications WO 2013/132424 and WO 2017/208152, whose disclosures are all incorporated herein by reference. Additionally or alternatively, the treatment fluid may be applied by jetting, prior to the ink jetting at the image forming station.

In the example of FIG. 1A, blanket treatment station 52 is mounted between roller 78 and roller 76, yet, blanket treatment station 52 may be mounted adjacent to ITM 44 at any other suitable location between impression station 84 and image forming station 60.

Reference is now made to FIG. 1B. In some embodiments, impression cylinder 102 impresses the ink image onto target flexible web continuous target substrate 50, conveyed by substrate transport module 100 from a pre-print buffer unit 86 to post-print buffer unit 88 via impression cylinder 102. As shown in module 100 of FIG. 1B, continuous target substrate 50 moves in module 100 at a direction represented by an arrow, also referred to herein as a moving direction 99, but may also move in a direction opposite to moving direction 99 as will be described below.

In some embodiments, the lower run of ITM 44 selectively interacts at impression station 84 with impression cylinder 102 to impress the image pattern onto the target flexible substrate compressed between ITM 44 and impression cylinder 102 by the action of pressure of pressure cylinder 90. In the case of a simplex printer (i.e., printing on one side of continuous target substrate 50) shown in FIG. 1A, only one impression station 84 is needed.

Reference is now made back to FIG. 1A. In some embodiments, rollers 78 are positioned at the upper run of ITM 44 and are configured to maintain ITM 44 taut when passing adjacent to image forming station 60. Furthermore, it is particularly important to control the speed of ITM 44 below image forming station 60 so as to obtain accurate jetting and deposition of the ink droplets, thereby placement of the ink image, by forming station 60, on the surface of ITM 44.

Reference is now made to FIG. 1B. In some embodiments, impression cylinder 102 is periodically engaged to and disengaged from ITM 44 to transfer the ink images from moving ITM 44 to continuous target substrate 50 passing between ITM 44 and impression cylinder 102. Note that if continuous target substrate 50 were to be permanently engaged with ITM 44 at impression station 84, then much of continuous target substrate 50 lying between printed ink images would need to be wasted. Embodiments described in FIGS. 1B and 1*n* FIG. 2 below, reduce the amount of wasted real estate of continuous target substrate 50 lying between the printed ink images.

In the context of the present invention and in the claims, the terms "engagement position" and "engagement" refer to close proximity between cylinders 90 and 102, such that ITM 44 and continuous target substrate 50 make physical contact with one another, e.g., at an engagement point 150. In the engagement position the ink image is transferred from ITM 44 to continuous target substrate 50. Similarly, the terms "disengagement position" and "disengagement" refer to a distance between cylinders 90 and 102, such that ITM 44 and continuous target substrate 50 do not make physical contact with one another and can move relative to one another.

In some embodiments, system 10 is configured to apply torque to ITM 44 using the aforementioned rollers and dancers, so as to maintain the upper run taut and to substantially isolate the upper run of ITM 44 from being affected by any mechanical vibrations occurred in the lower run.

Reference is now made to FIG. 1B. In some embodiments, system 10 comprises an image quality control station 55, also referred to herein as an automatic quality management (AQM) system, which serves as a closed loop inspection system integrated in system 10. In some embodiments, station 55 may be positioned adjacent to impression cylinder 102, as shown in FIG. 1A, or at any other suitable location in system 10.

In some embodiments, station 55 comprises a camera (shown in FIG. 6 below), which is configured to acquire one or more digital images of the aforementioned ink image printed on continuous target substrate 50. In some embodiments, the camera may comprise any suitable image sensor, such as a Contact Image Sensor (CIS) or a Complementary metal oxide semiconductor (CMOS) image sensor, and a scanner comprising a slit having a width of about one meter or any other suitable width.

In some embodiments, station 55 may comprise a spectrophotometer (not shown) configured to monitor the quality of the ink printed on continuous target substrate 50.

In some embodiments, the digital images acquired by station 55 are transmitted to a processor, such as processor 20 or any other processor of station 55, which is configured to assess the quality of the respective printed images. Based on the assessment and signals received from controller 54, processor 20 is configured to control the operation of the modules and stations of system 10. In the context of the present invention and in the claims, the term "processor" refers to any processing unit, such as processor 20 or any other processor connected to or integrated with station 55, which is configured to process signals received from the camera and/or the spectrophotometer of station 55. Note that the signal processing operations, control-related instructions, and other computational operations described herein may be carried out by a single processor, or shared between multiple processors of one or more respective computers.

In some embodiments, station 55 is configured to inspect the quality of the printed images and test pattern so as to monitor various attributes, such as but not limited to full image registration with continuous target substrate 50, color-to-color registration, printed geometry, image uniformity, profile and linearity of colors, and functionality of the print nozzles. In some embodiments, processor 20 is configured to automatically detect geometrical distortions or other defects and/or errors in one or more of the aforementioned attributes. For example, processor is configured to compare between a design version of a given digital image and a digital image of the printed version of the given image, which is acquired by the camera.

In other embodiments, processor 20 may apply any suitable type of image processing software, e.g., to a test pattern, for detecting distortions indicative of the aforementioned errors. In some embodiments, processor 20 is configured to analyze the detected distortion in order to apply a corrective action to the malfunctioning module, and/or to feed instructions to another module or station of system 10, so as to compensate for the detected distortion.

In some embodiments, processor 20 is configured to analyze the signals acquired by station 55 so as to monitor the nozzles of image forming station 60. By printing a test pattern of each color of station 60, processor 20 is configured to identify various types of defects indicative of malfunctions in the operation of the respective nozzles.

In some embodiments, the processor of station 55 is configured to decide whether to stop the operation of system 10, for example, in case the defect density is above a specified threshold. The processor of station 55 is further configured to initiate a corrective action in one or more of the modules and stations of system 10. The corrective action may be carried out on-the-fly (while system 10 continue the printing process), or offline, by stopping the printing operation and fixing the problem in a respective modules and/or station of system 10. In other embodiments, any other processor or controller of system 10 (e.g., processor 20 or controller 54) is configured to start a corrective action or to stop the operation of system 10 in case the defect density is above a specified threshold.

Additionally or alternatively, processor 20 is configured to receive, e.g., from station 55, signals indicative of additional types of defects and problems in the printing process of system Based on these signals processor 20 is configured to automatically estimate the level of pattern placement accuracy and additional types of defects not mentioned above. In other embodiments, any other suitable method for examining the pattern printed on continuous target substrate 50, can also be used, for example, using an external (e.g., offline) inspection system, or any type of measurements jig and/or scanner. In these embodiments, based on information received from the external inspection system, processor 20 is configured to initiate any suitable corrective action and/or to stop the operation of system 10.

Reference is now made to FIG. 1A. In some embodiments, substrate transport module 100 is configured to receive (e.g., pull) continuous target substrate 50 from a pre-print roller, also referred to herein as a pre-print winder 180 located external to pre-print buffer unit 86.

In some embodiments, substrate transport module 100 is configured to convey web continuous target substrate 50 from pre-print buffer unit 86, via impression station 84 for receiving the ink image from ITM 44, to post-print buffer unit 88.

In some embodiments, buffer units 86 and 88 comprise, each, one or more buffer idlers 104 also referred to herein as buffer rollers. Each buffer idler 104 has a fixed axis and configured to roll around the fixed axis so as to guide continuous target substrate 50 along substrate transport module 100 and to maintain a constant tension in continuous target substrate 50.

In the example of FIG. 1B, buffer unit 86 comprises six buffer idlers 104, and buffer unit 88 comprises seven buffer idlers 104, but in other configurations each buffer unit may have any other suitable number of buffer idlers 104. In other embodiments, at least one of buffer idlers 104 may have a movable axis so as to control the level of mechanical tension in continuous target substrate 50.

In some embodiments, substrate transport module 100 comprises a web guide unit 110, which comprises one or more rollers 108, sensors and motors (not shown), and is configured to maintain a specified (typically constant) tension in continuous target substrate 50 and to align between substrate 100 and the rollers and idlers of substrate transport module 100.

In some embodiments, substrate transport module 100 comprises idlers 106 mounted adjacent to unit 110. Each idler 106 has a fixed axis and configured to roll around the fixed axis so as to guide continuous target substrate 50 along substrate transport module 100 and to maintain the tension applied to continuous target substrate 50 by web guide unit 110. In other embodiments, at least one of idlers 106 may have a movable axis.

In some embodiments, substrate transport module 100 comprises one or more tension control units, such as tension control units 112 and 128. Each of these tension control units is configured to sense the tension in continuous target substrate 50, and based on the sensing, to adjust the level of tension so as to maintain continuous target substrate 50 taut when passing between buffer units 86 and 88. In the example of FIG. 1B, module 100 comprises unit 112 mounted between buffer unit 86 and impression station 84, and unit 128 mounted between impression station 84 and buffer unit 88.

In some embodiments, each of these tension control units comprises a tension sensing roller 114, which is configured to sense the level of tension in continuous target substrate 50 by applying to continuous target substrate 50 a predefined weight or using any other suitable sensing mechanism. The tension control unit is configured to send electrical signals indicative of the level of tension, sensed by roller 114, to controller 54 and/or to processor 20.

In some embodiments, each of units 112 and 128 further comprises a gear, also referred to herein as a pulley 116, which is coupled to a motor (not shown) configured to adjust the tension in continuous target substrate 50 based on the level of tension sensed by roller 114. The motor may be driven by controller 54 and/or by processor 20 and/or by any suitable type of driver.

In some embodiments, each of units 112 and 128 further comprises a backing nip roller 118 and a tension roller 122, which is motorized by pulley 116 using a belt 124 or any other suitable mechanism. Backing nip roller 118 comprises a movable axis and a pneumatic piston configured to move the movable axis so as to couple between continuous target substrate 50 and tension roller 122.

In some embodiments, substrate transport module 100 comprises multiple idlers 106 located between tension control unit 128 and post-print buffer unit 88 and configured to maintain the tension applied to continuous target substrate 50 by tension control unit 128. After receiving the ink image at impression station 84, continuous target substrate 50 is moved from unit 128 to post-print buffer unit 88 and is subsequently moved to and rolled on a post-print roller, also referred to herein as a rewinder 190.

In some embodiments, the aforementioned rotogravure printing apparatus (as well as other optional printing modules for applying the white ink) may be coupled to system 10 at any suitable location, such as between pre-print winder 180 and pre-print buffer unit 86. Additionally or alternatively, the rotogravure printing apparatus may be coupled to system 10 between post-print buffer unit 88 and rewinder 190.

In some embodiments, system 10 comprises a pressure roller block 140 coupled to substrate transport module 100. Block 140 is configured to fix pressure cylinder 90 relative to substrate transport module 100. Block 140 is further configured to fix a blanket idler 142 mounted thereon. Idler 142 is configured to maintain tension in ITM 44.

In some embodiments, substrate transport module 100 comprises a backtracking mechanism also referred to herein as a backtracking module 166, which is configured to backtrack continuous target substrate 50 relative to moving direction 99. In other words, module 166 is configured to move continuous target substrate 50 in a direction opposite to direction 99.

In some embodiments, backtracking module 166 comprises two or more displaceable rollers, in the example of FIG. 1B, dancers 120 and 130, each of these dancers has a physical contact with continuous target substrate 50 and configured to backtrack continuous target substrate 50 by moving relative to one another. The operation of backtracking module 166 is described in detail in FIG. 2 below.

As described above, impression cylinder 102 is periodically engaged to and disengaged from ITM 44 to transfer the ink images from moving ITM 44 to continuous target substrate 50 passing between ITM 44 and impression cylinder 102. As shown in FIG. 1B, pressure cylinder and impression cylinder 102 are engaged with one another at engagement point 150 so as to transfer the ink image from ITM 44 to continuous target substrate 50.

In some embodiments, pressure cylinder 90 has a fixed axis, whereas impression cylinder 102 has a displaceable axis that enables the aforementioned engagement and disengagement.

In alternative embodiments, system 10 may have any other suitable configuration to support the engagement and disengagement operations. For example, both cylinders 90 and 102 may have, each, a displaceable axis, or cylinder 102 may have a fixed axis whereas cylinder 90 may have a displaceable axis.

In some embodiments, pressure cylinder 90 is configured to rotate about its axis at a first predefined velocity using a rotary motor (not shown). Similarly, impression cylinder 102 is configured to rotate about its axis at a second predefined velocity using another rotary motor (not shown). These rotary motors may comprise any suitable type of an electrical motors driven and controlled by any suitable driver and/or by controller 54 and/or by processor 20.

Note that at engagement point 150 it is important to match the linear velocities of cylinders 90 and 102 so as to enable accurate transfer of the ink image from ITM 44 to continuous target substrate 50. In some embodiments, processor 20, or any other processor or controller of system, is configured to match the first velocity of cylinder 90 and the second velocity of cylinder 102 at engagement point 150.

In other embodiments, both pressure cylinder 90 and impression cylinder 102 may be motorized to carry out the rotary motion using any other suitable type of motion mechanism that enables matching the aforementioned first and second velocities at engagement point 150.

The configuration of system 10 is simplified and provided purely by way of example for the sake of clarifying the present invention. The components, modules and stations described in printing system 10 hereinabove and additional components and configurations are described in detail, for example, in U.S. Pat. Nos. 9,327,496 and 9,186,884, in PCT International Publications WO 2013/132438, WO 2013/132424 and WO 2017/208152, in U.S. Patent Application Publications 2015/0118503 and 2017/0008272, whose disclosures are all incorporated herein by reference.

FIG. 1A shows digital printing system 10 having only a single impression station 84, for printing on only one side of continuous target substrate 50. To print on both sides a tandem system can be provided, with two impression stations and a web substrate inverter mechanism may be provided between the impression stations to allow turning over of the web substrate for double sided printing. Alternatively, if the width of ITM 44 exceeds twice the width of continuous target substrate 50, it is possible to use the two halves of the same blanket and impression cylinder to print on the opposite sides of different sections of the web substrate at the same time.

The particular configurations of system 10 is shown by way of example, in order to illustrate certain problems that are addressed by embodiments of the present invention and to demonstrate the application of these embodiments in enhancing the performance of such systems. Embodiments of the present invention, however, are by no means limited to this specific sort of example systems, and the principles described herein may similarly be applied to any other sorts of printing systems.

Figure 2:
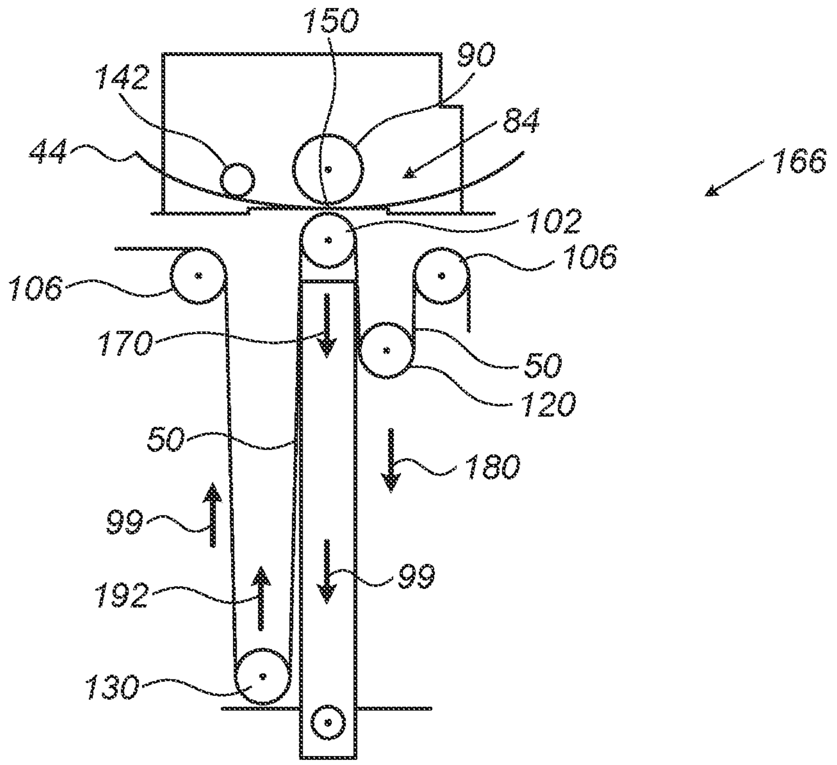
FIG. 2 is a schematic side view of a backtracking module, in accordance with an embodiment of the present invention.

Preventing Physical Contact Between the Seam Section and the Continuous Web Substrate FIG. 2 is a schematic side view of backtracking module 166, in accordance with an embodiment of the present invention. In some embodiments, dancers 120 and 130 are motorized and processor 20 is configured to move dancers 120 and 130 up and down in opposite directions synchronized with one another.

In some embodiments, processor 20 is configured to prevent physical contact between continuous target substrate 50 and the seam section of ITM 44 by performing a sequence comprising disengagement between cylinders 90 and 102, temporal backtracking a given section of continuous target substrate 50, and reengagement of cylinders 90 and 102. The sequence is described in detail herein. The length of the given section depends on various parameters, such as but not limited to the transition time between disengagement and engagement positions, and the specified velocity of continuous target substrate 50.

After the ink image has been transferred at engagement point 150, from ITM 44 to continuous target substrate 50, processor 20 disengages impression cylinder 102 from pressure cylinder 90 by moving cylinder 102 in a direction 170, also referred to herein as "downwards," so as to allow continuous target substrate 50 and ITM 44 to move relative to one another.

In an embodiment, in response to the disengagement, at least one of tension sensing rollers 114 senses a change in the level of tension in continuous target substrate 50. In some embodiments, processor 20 receives an electrical signal indicative of the sensed tension and moves dancer 120 in a direction 180, also referred to herein as "downwards" and at the same time moves dancer 130 in a direction 192, also referred to herein as "upwards." In this embodiment, the given section of continuous target substrate 50 located between dancers 120 and 130 is backtracked, whereas the other sections of continuous target substrate 50 continue to move forward at the specified velocity, which may be similar or almost similar to the velocity of continuous target substrate 50 when cylinders 90 and 102 are engaged with one another.

In some embodiments, processor 20 is configured to carry out the backtracking by taking up slack from the run of continuous target substrate 50 following impression cylinder 102 and transferring the slack to the run preceding impression cylinder 90. Subsequently, processor 20 reverses the motion of dancers 120 and 130 to return them to the position illustrated in FIG. 2, so that the given section of continuous target substrate 50 is again accelerated up to the specified velocity of ITM 44. In some embodiments, processor 20 also moves impression cylinder 102 towards pressure cylinder 90 (i.e., opposite to direction 170) so as to reengage therebetween and to resume the ink image transfer from ITM 44 to continuous target substrate 50. Note that the sequence of disengaging, backtracking and reengaging described above enables system 10 to prevent physical contact between continuous target substrate 50 and the seam section of ITM 44 without leaving large blank areas between the images printed on continuous target substrate 50.

In some embodiments, impression cylinder 102 is mounted on any suitable mechanism, which is controlled by processor 20 and is configured to move cylinder 102 downwards (e.g., in direction 170) to the disengagement position, and upwards (e.g., opposite to direction 170) to the engagement position. In an example embodiment, cylinder 102 is mounted on an eccentric 172 that is rotatable using any suitable motor or actuator (not shown).

In some embodiments, eccentric 172 may be coupled, e.g., by a belt to idler 106 and to a motorized gear (not shown), so as to cause a rotary move of cylinder 102. In an embodiment, cylinder 102 is moved to the engagement position when eccentric 172 is rotated by the aforementioned motor or actuator to an upper position within a support frame 98 of module 100. This position is illustrated in FIG. 2. In another embodiment, cylinder 102 is moved to the disengagement position when eccentric 172 is rotated to a lower position in direction 170. The eccentric-based engagement and disengagement mechanism described above, enables fast and reliable transition between the engagement and disengagement positions of cylinder 102.

In other embodiments, processor 20 is configured to prevent physical contact between continuous target substrate 50 and any pre-defined section of ITM 44 other than the coupling section, and particularly, the seam section described above. In these embodiments, processor 20 is configured to carry out, within one cycle of ITM 44, multiple disengagements between cylinders 90 and 102. For example, one disengagement to prevent physical contact between the seam section and continuous target substrate 50, and at least one more disengagement to prevent physical contact between any other predefined section of ITM 44 and continuous target substrate 50.

In other embodiments, the engagement and disengagement mechanism may be carried out using any other suitable technique, such as but not limited to a piston-based, a spring-based, or a magnetic-based mechanism.

The particular configurations and operation of the engagement and disengagement mechanism and of backtracking module 166 are simplified and shown by way of example, in order to illustrate certain problems that are addressed by embodiments of the present invention and to demonstrate the application of these embodiments in enhancing the performance of system 10. Embodiments of the present invention, however, are by no means limited to this specific sort of example modules and mechanisms, and the principles described herein may similarly be applied to any other sorts of printing systems.

Controlling the Substrate Transport Module

Figure 3:
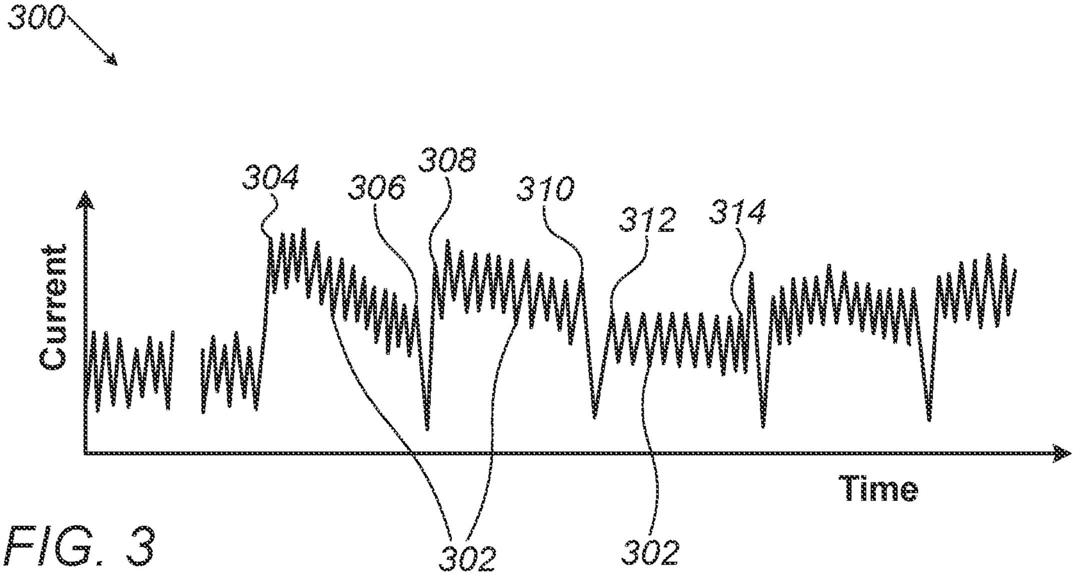
FIG. 3 is a schematic, pictorial illustration of a graph used for controlling a substrate transport module, in accordance with an embodiment of the present invention.

FIG. 3 is a schematic, pictorial illustration of a graph 300 that depicts motor current over time and that can be used for controlling substrate transport module 100, in accordance with an embodiment of the present invention.

As described above, at the engagement position pressure cylinder 90 and impression cylinder 102 are engaged with one another and processor 20 is configured to match the linear velocities of cylinders 90 and 102 at engagement point 150. System 10 further comprises one or more electrical motors configured to move one or both of cylinders 90 and 102 that move ITM 44 and continuous target substrate 50, respectively.

In some embodiments, a line 302 in graph 300 comprises multiple points that represent respective measurements of the current flowing through an electrical motor that moves cylinder as a function of time. In some embodiments, temporal variations in the current flowing through the electrical motor are indicative of a mismatch between the linear velocities of cylinders 90 and 102. Note that any undesired or unspecified force applied to at least one of cylinders 90 and 102, ITM 44 and continuous target substrate 50, may cause the temporal variations in the current flowing through the electrical motor. For example, the mismatch between the linear velocities of cylinders 90 and 102 may cause ITM 44 to apply unspecified torque to cylinder 90.

In some embodiments, system 10 may comprise additional measurement capabilities, which are configured to measure at least some of the torque and other forces applied to the aforementioned elements of buffer units 86 and 88.

For example, a point 304 of graph 300 is indicative of the current flowing through the electrical motor when the engagement between cylinders 90 and 102 starts. As shown in graph 300, the slope of line 302 between point 304, in which the engagement starts, and a point 306 in which the engagement is terminated indicates of a current reduction during that time interval. Note that in evaluating the slope we ignore rapid low-amplitude variations of the electrical current, depicted as saw-tooth wave in graph 300.

The temporal variations, such as the slope between points 304 and 306 as well as any other variations, are indicative of undesired interaction between cylinders 90 and 102 due to the unmatched velocities thereof. In the example of FIG. 3, the motor that rotates cylinder 90 moves cylinder 90 at a velocity higher than the velocity of cylinder 102. As a result, the motor of cylinder 90 reduces the velocity so as to match between the linear velocities of cylinders 90 and 102. Therefore the current flowing through the motor gradually reduces during the time interval between points 304 and 306.

Similarly, when the motor moves cylinder 90 at a linear velocity lower than the linear velocity of cylinder 102, cylinder 102 pulls cylinder 90 (e.g., because of the friction force between continuous target substrate 50 and ITM 44) and the motor of cylinder 90 should move faster, resulting in increased electrical current flowing through the motor of cylinder 90.

In some embodiments, processor 20 is configured to receive, from at least one of the electrical motors, the current measurements (using any suitable sampling frequency, such as but not limited to, 500 Hz) shown in graph 300 and to evaluate the trend, e.g., over successive or overlapping time intervals, or over a predefined slope value. Based on the temporal trend, processor 20 is configured to adjust the velocity of at least one of the electrical motors, so as to match between the linear velocities of cylinders 90 and 102 by reducing the temporal variation in the electrical current.

For example, a time interval of line 302 between points 308 and 310 is indicative of the current flowing through the motor of cylinder 90 during an additional cycle of engagement and transfer of the ink image from ITM 44 to continuous target substrate 50. As shown in FIG. 3, the slope of this time interval is substantially smaller than the slope of line 302 between points 304 and 306, indicating that the underlying velocities almost match.

In a further example of graph 300, points 312 and 314 of line 302 represent the start and end of another engagement cycle between cylinders 90 and 102. In some embodiments, processor 20 has matched the linear velocities of cylinders 90 and 102, such that line 302 has zero (or close to zero) slope during the time interval between points 312 and 314.

Note that the linear velocities of cylinders 90 and 102 may differ from one another because of various reasons, such as different thermal expansion between cylinders 90 and 102 and other reasons described herein.

Figure 4:
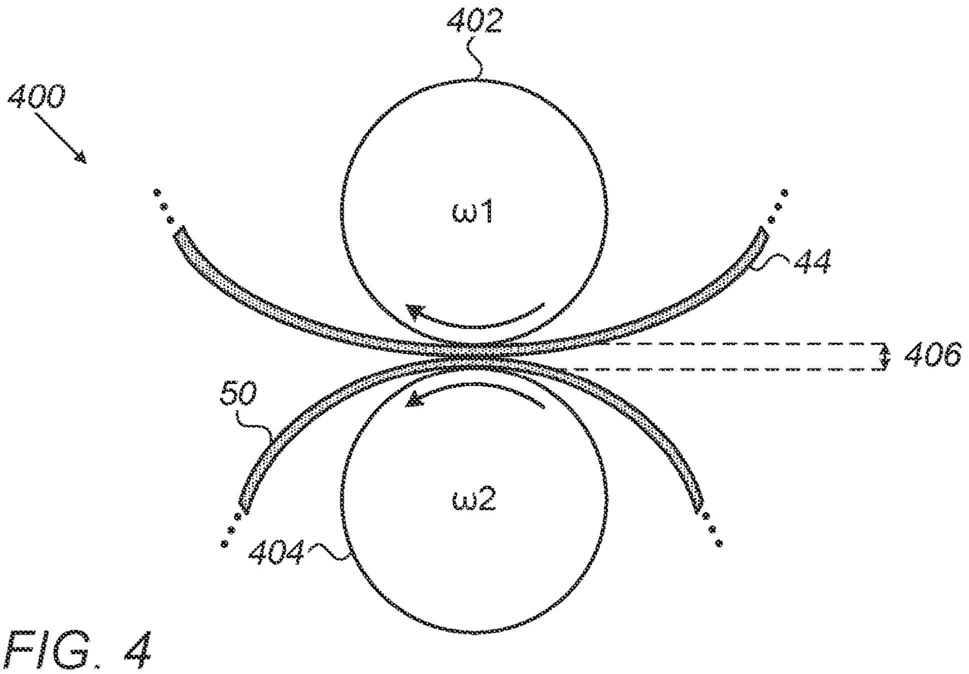
FIG. 4 is a schematic side view of an impression station of a digital printing system, in accordance with an embodiment of the present invention.

FIG. 4 is a schematic side view of an impression station 400 of a digital printing system, such as system 10, in accordance with an embodiment of the present invention. Impression station 400 may replace, for example, impression station 84 shown of FIG. 1B above.

In some embodiments, station 400 comprises an impression cylinder 402 and a pressure cylinder 404 rotated by respective first and second motors at respective $\omega_1$ and $\omega_2$ rotary velocities.

In some embodiments, ITM 44 and continuous target substrate 50 are moved through station 400 so as to transfer an ink image from ITM 44 to continuous target substrate 50. During the setup of station 400, a predefined distance 406 is set between cylinders 402 and 404. In some embodiments, at least one of cylinders 402 and 404 comprises an encoder (not shown), which is configured to record the positions of ITM 44 and continuous target substrate 50, respectively.

In some embodiments, processor 20 is configured to receive from the encoder of cylinder 402, multiple position signals indicative of the position of respective sections of ITM 44. Based on the position signals, processor 20 is configured to calculate the linear velocity of ITM 44 and a rotary velocity $\omega_1$ of cylinder 402.

In some embodiments, processor 20 is configured to adjust a rotary velocity $\omega_2$ of cylinder 404 so as to match between the linear velocities of ITM 44 and continuous target substrate 50 at engagement point 150. In the context of the present disclosure, and in the claims, the terms "rotational velocity" and "rotary velocity" are used interchangeably and refer to the velocities of the various drums, cylinders and rollers of system 10.

In some cases, different substrates may have different thickness, for example, due to different requirements of mechanical strength or due to regulatory requirements. In principle, it is possible to adjust distance 406 for every substrate, however this adjustment reduces the productivity, e.g., hourly output, of system 10 and may also complicate the operation thereof.

In some embodiments, processor 20 is configured to receive a digital signal, which is based on a converted analog signal indicative of the current flowing through at least one of the first and second motors of station 400, and to compensate for the different thickness of continuous target substrate 50 by changing at least one of rotary velocities $\omega_1$ and $\omega_2$. By applying adjusted driving voltages and/or currents to at least one of the first and second motors, system 10 may switch between different types of substrates having different thicknesses without making hardware or structural changes, such as changing the value of distance 406. Note that distance 406 may be initially set in accordance with the expected typical thickness of the target substrate, for example, PET and OPP are thinner than paper. In case of large differences between the thicknesses of different substrates (e.g., double thickness or more), processor 20 is configured to set, for example, two values of distance 406, and to adjust for each set the corresponding rotary velocities.

In other embodiments, processor 20 is configured to apply the same techniques to compensate for a change in the diameter (e.g., due to a thermal expansion) of at least one of cylinders 402 and 404, or to compensate for a change in the thickness of ITM 44, or for other undesired effects that may impact the operation of station 400.

In some embodiments, processor 20 is configured to improve the impression process by tightening the control of station 400 and continuously adjusting and matching the linear velocities of ITM 44 and continuous target substrate 50. By improving the impression process, processor 20 may improve the quality of the ink image printed on continuous target substrate 50.

FIG. 5 is a schematic side view of an image forming station 500 and drying stations 502 and 504 that are part of digital printing system 10, in accordance with an embodiment of the present invention. Image forming station 500 and drying station 502 may replace, for example, respective stations 60 and 64 of FIG. 1A above, and drying station 504 may replace, for example, station 75 of FIG. 1A above, or be added in a different configuration described herein.

In some embodiments, image forming station 500 comprises multiple print bars, such as, for example, a white print bar 510, a black print bar 530, a cyan print bar 540, a magenta print bar 550, and a yellow print bar 560.

In some embodiments, station 500 comprises multiple infrared-based dryers (IRDs) 520A-520E. Each IRD is configured to apply a dose of infrared (IR) radiation to the surface of ITM 44 facing station 500. The IR radiation is configured to dry ink that was previously applied to the surface of ITM 44. In some embodiments, at least one of the IRDs may comprise an IR dryer only, or a combination of an IR-based and a hot air-based dryer.

In some embodiments, station 500 comprises multiple blowers 511A-511E having a configuration similar to air blowers 66 of FIG. 1A above.

In some embodiments, station 500 comprises three IRDs 520A-520C and two blowers 511A and 511B arranged in an illustrated exemplary sequence of FIG. 5, so as to dry the white ink applied to ITM 44 using print bar 510.

In some embodiments, a single blower such as any blower from among blowers 511C, 511D, 511E, and 511F, is mounted after each print bars 530, 540, 550 and 560, respectively, and two IRDs 520D and 520E are mounted between yellow print bar 560 and dryer 502.

In some embodiments, drying station 502 comprises eight sections of blowers (not shown), wherein each blower is similar to air blower 68 of FIG. 1A above. In other embodiments, the blower may be arranged in four sections, each section comprising two blowers. In alternative embodiments, drying station 502 may comprise any suitable type and number of dryers arranged in any suitable configuration.

In some embodiments, drying station 504 comprises a single IRD, or an array of multiple IRDs (not shown), and is configured to apply the last dose of IR to ITM 44 before the respective ink image enters the impression station.

The configuration of image forming station 500 is simplified for the sake of clarity and is described by way of example. In other embodiments, the image forming station of the digital printing system may comprise any other suitable configuration.

Although the embodiments described herein mainly address digital printing on a continuous web substrate, the methods and systems described herein can also be used in other applications.

Figure 6:
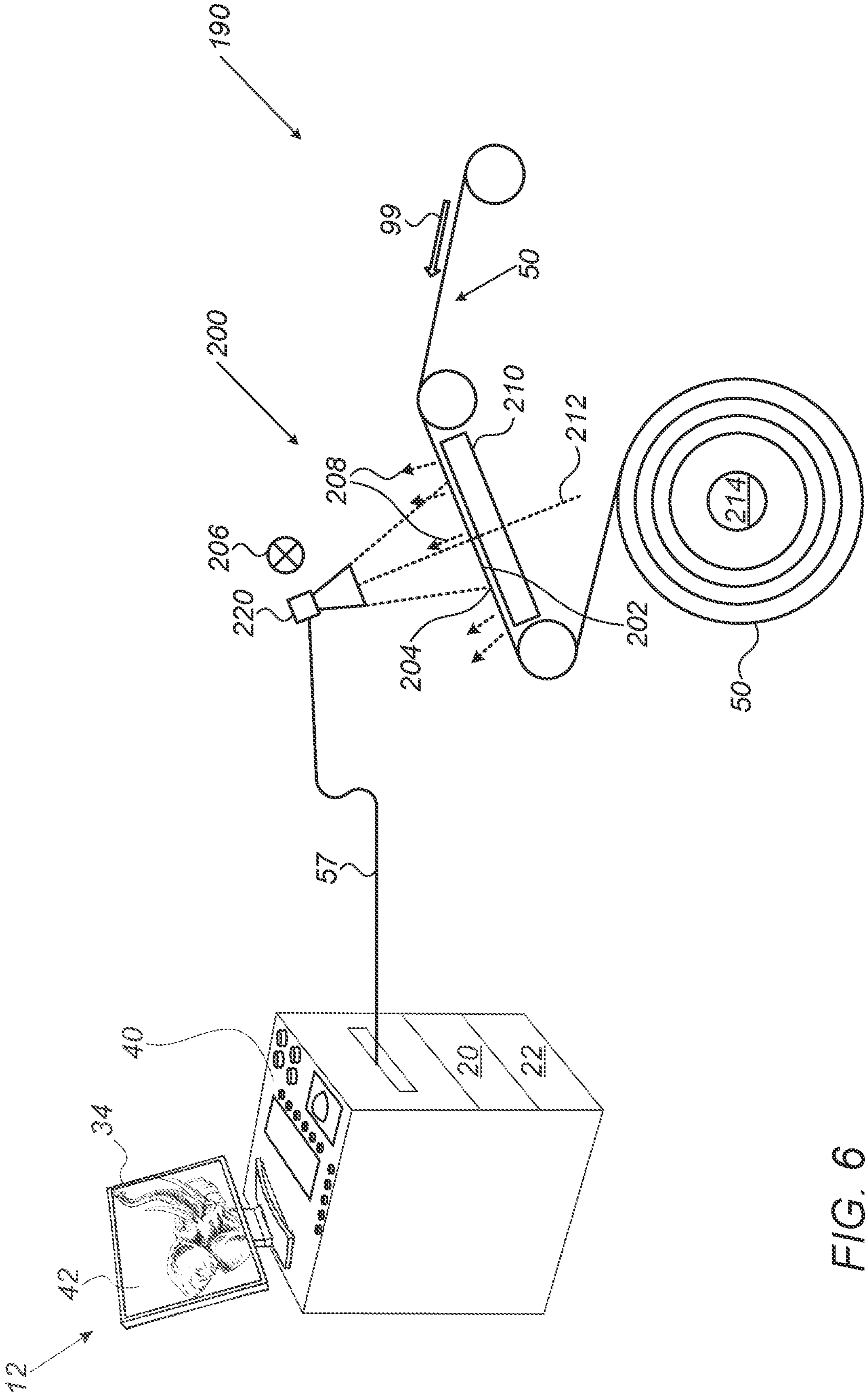
FIG. 6 is a schematic side view of an inspection module integrated into a digital printing system, in accordance with an embodiment of the present invention.

Transmission-Based Imaging a Pattern Printed on the Continuous Web Substrate FIG. 6 is a schematic side view of an inspection station 200 integrated into digital printing system 10, in accordance with an embodiment of the present invention. In an embodiment, inspection station 200 is integrated into rewinder 190 of digital printing system 10, before continuous target substrate 50 having images printed thereon is rolled on a roller 214.

In another embodiment, inspection station 200 may be mounted on or integrated into any other suitable station or assembly of digital printing system 10, using any suitable configuration.

As described above, continuous target substrate 50 is made from one or more layers of any suitable material, such as polyester, polyethylene terephthalate (PET), or oriented polypropylene (OPP) or any other materials suitable for flexible packaging in a form of continuous web. Such materials are partially transparent to a visible light, and yet are typically reflecting at least part of the visible light. Reflections from continuous target substrate 50 may reduce the ability of an integrated inspection system to produce an image of continuous target substrate 50, and/or to detect various types of process problems and defects formed during the digital printing process described above.

Note that several types of process problems and defects may occur in continuous target substrate 50. For example, random defects, such as a particle or scratch on the surface or between layers of continuous target substrate 50, and systematic defects, such as a missing or blocked nozzle in one or more of print bars 62.

In some embodiments, inspection station 200 comprises a light source, also referred to herein as a backlight module 210, which is configured to illuminate a lower surface 202 of continuous target substrate 50 with one or more light beams 208.

In some embodiments, backlight module 210 may comprise any suitable type of light source (not shown), such as one or more light emitting diodes (LEDs), a fluorescent-based light source, a neon-based light source, and one or more incandescent bulbs. The light source may comprise a light diffuser, or may be coupled to a light diffusing apparatus (not shown). In some embodiments, the light diffusing apparatus, also referred to herein as a light diffuser, is configured to provide inspection station 200 with a diffused light having a uniform illumination profile that improves the performance of the image processing algorithms.

In some embodiments, backlight module 210 is configured to emit any spectrum of light, such as white light, any selected range within the visible light, or any frequency or range of frequencies of invisible light (e.g., infrared or ultraviolet).

In some embodiments, backlight module 210 is configured to emit the light using any illumination mode, such as continuous illumination, pulses or any other type of illumination mode having a symmetric or asymmetric shape.

In some embodiments, backlight module 210 is electrically connected to any suitable power supply unit (not shown), configured to supply backlight module 210 with a suitable voltage current, or any other suitable power.

In some embodiments, inspection station 200 comprises an image sensor assembly 220, which is configured to acquire images based on at least a portion of light beam 208 transmitted through continuous target substrate 50.

In some embodiments, image sensor assembly 220 is electrically connected to control console 12 and is configured to produce electrical signals in response to the imaged light, and to transmit the electrical signals, e.g., via cable 57, to processor 20 of control console 12.

In some embodiments, image sensor assembly 220 is facing an upper surface 204 of continuous target substrate 50 and backlight module 210. In the example of FIG. 6, an illumination axis 212, which is extended between image sensor assembly 220 and backlight module 210, is substantially orthogonal to continuous target substrate 50. In this configuration, inspection station 200 is configured to produce a bright-field image of the ink image applied to continuous target substrate 50, and may also acquire images of defects that may exist on surfaces 202 and 204, or within continuous target substrate 50. The type of defects and geometric distortion are describe in detail in FIG. 7 below.

In other embodiments, image sensor assembly 220 and/or backlight module 210 may be mounted on digital printing system 10 using any other suitable configuration. For example, image sensor assembly 220 may comprise one or more imaging sub-assemblies (not shown) arranged at an angle relative to illumination axis 212, so as to produce a dark-field image of continuous target substrate 50.

As described in FIG. 1B above, substrate transport module 100 is configured to move continuous target substrate 50 in direction 99. In some embodiments, image sensor assembly 220 is mounted on a scanning apparatus (not shown), e.g., a stage, which is configured to move image sensor assembly 220 in a direction 206, typically orthogonal to direction 99.

In some embodiments, processor 20 is configured to control the motion profile in directions 99 and 206 so as to acquire images from selected locations by placing the selected location of continuous target substrate 50 between backlight module 210 and image sensor assembly 220.

In some embodiments, image sensor assembly 220 comprises any suitable camera (not shown), such as a surface camera comprising, for example, a 12 megapixel (MP) image sensor coupled to any suitable lens.

In some embodiments, the camera of image sensor assembly 220 may have any suitable field of view (FOV), such as but not limited to 8 cm-15 cm by 4 cm-8 cm, which is configured to provide any suitable resolution, such as 1000 dots per inch (dpi), which translates to a pixel size of 25 μm. The camera is configured to have different resolution and FOV subject to the tradeoff between FOV. For example, the camera may have a resolution of 2000 dpi using a smaller FOV.

In some embodiments, processor 20 is configured to receive a set of FOVs from the camera, and to stitch multiple FOVs so as to display an image of a selected region of interest (ROI) of continuous target substrate 50.

In some embodiments, system 10 applies to the surface of continuous target substrate 50 a base-layer of a white ink, as described in FIG. 1A above. The substrate and white ink are highly reflective but by using the configuration of inspection station 200, image sensor assembly 220 is configured to image at least a portion of light beams 208 transmitted through continuous target substrate 50 and white ink.

In some embodiments, image sensor assembly 220 is further configured to detect different intensities of light transmitted through a stack comprising continuous target substrate base-layer and ink pattern. For example, the white ink is partially transparent to light beams 208, therefore, different densities and/or thicknesses of the white ink will result in different intensities of transmitted beams 208, and therefore, different electrical signals produced by image sensor assembly 220. In some embodiments, system 10 is configured to apply different densities and/or thicknesses of white ink, as well as other colors of ink, to continuous target substrate 50, by controlling the amount of the respective ink droplets disposed on a predefined area on surface 204 of continuous target substrate 50.

In some embodiments, processor 20 is configured to produce, in the digital image, different gray levels that are indicative, for example, of the density and/or thickness of the white ink applied to surface 204 of continuous target substrate 50.

In some embodiments, continuous target substrate 50 may comprise various types of printed and/or integrated marks (not shown), such as but not limited to alignment marks, stitching marks for the stitching operation described above, and barcode marks. In some embodiments, system 10 may comprise sensors configured to read the marks of continuous target substrate 50 so as to monitor the printing process as will be described in detail in FIG. 7 below.

In some embodiments, system 10 is configured to scan the entire area of continuous target substrate 50 using a fast scanning in direction 206 when substrate transport module 100 move continuous target substrate 50 in direction 99. Additionally or alternatively, system 10 may comprise multiple inspection stations 200 arranged, for example, in direction 206 across the width of continuous target substrate 50, so as to cover the entire area of continuous target substrate 50. In yet other embodiments, system 10 may comprise any other suitable configuration, such as multiple cameras having, each, a predefined motion path along direction 206, such that at least some of these cameras cover the entire area of continuous target substrate 50.

In other embodiments, inspection station 200 may comprise multiple image sensor assemblies 220 arranged, for example, in direction 206 across the width of continuous target substrate 50, so as to cover the entire area of continuous target substrate 50, using a single backlight module 210 described above.

In the example on FIG. 6, backlight module 210 is static and image sensor assembly 220 is moving. In alternative embodiments, inspection station 200 may have any other suitable configuration. For example, both backlight module 210 and image sensor assembly 220 may be movable by processor 20, or backlight module 210 is movable and one or more image sensor assemblies 220 are static.

This particular configuration of inspection station 200 is shown by way of example, in order to illustrate certain problems that are addressed by embodiments of the present invention and to demonstrate the application of these embodiments in enhancing the performance of such an inspection station 200 and of system 10. Embodiments of the present invention, however, are by no means limited to these specific sort of example inspection station and digital printing system, and the principles described herein may similarly be applied to other sorts of inspection stations printing systems. For example, system 10 may comprise, a blanket inspection station (not shown) having any configuration suitable for detecting defects and/or distortions on ITM 44 before transferring the ink image to continuous target substrate 50. The blanket inspection station may be integrated into system 10 at any suitable location, and may operate in addition to, or instead of inspection station 200.

In other embodiments, control console 12 may be electrically connected to an external inspection system (not shown), also referred to herein as a stand-alone inspection system, having any suitable configuration, such as the configuration of inspection station 200. The stand-alone inspection system is configured to image at least a portion of the light transmitted through continuous target substrate 50, and to produce electrical signals in response to the imaged light. Note that the stand-alone inspection system, which inspects continuous target substrate 50 after the printing process described above, may operate instead of, or in addition to inspection station 200.

In some embodiments, processor 20 is configured to produce the digital image based on the electrical signals received from inspection station 200 and/or from the stand-alone inspection system, each of which may inspect a different section of continuous target substrate 50 and/or may apply a different inspection technique (hardware and software) so as to inspect different features in question, such as marks and ink patterns, of continuous target substrate 50.

In other embodiments, the stand-alone inspection system may comprise one or more processors, interface circuits, memory devices and other suitable devices, so as to carry out the aforementioned imaging and the detection described below, and may send an output file to processor 20 for improving the controlled operation of system 10.

Figure 7:
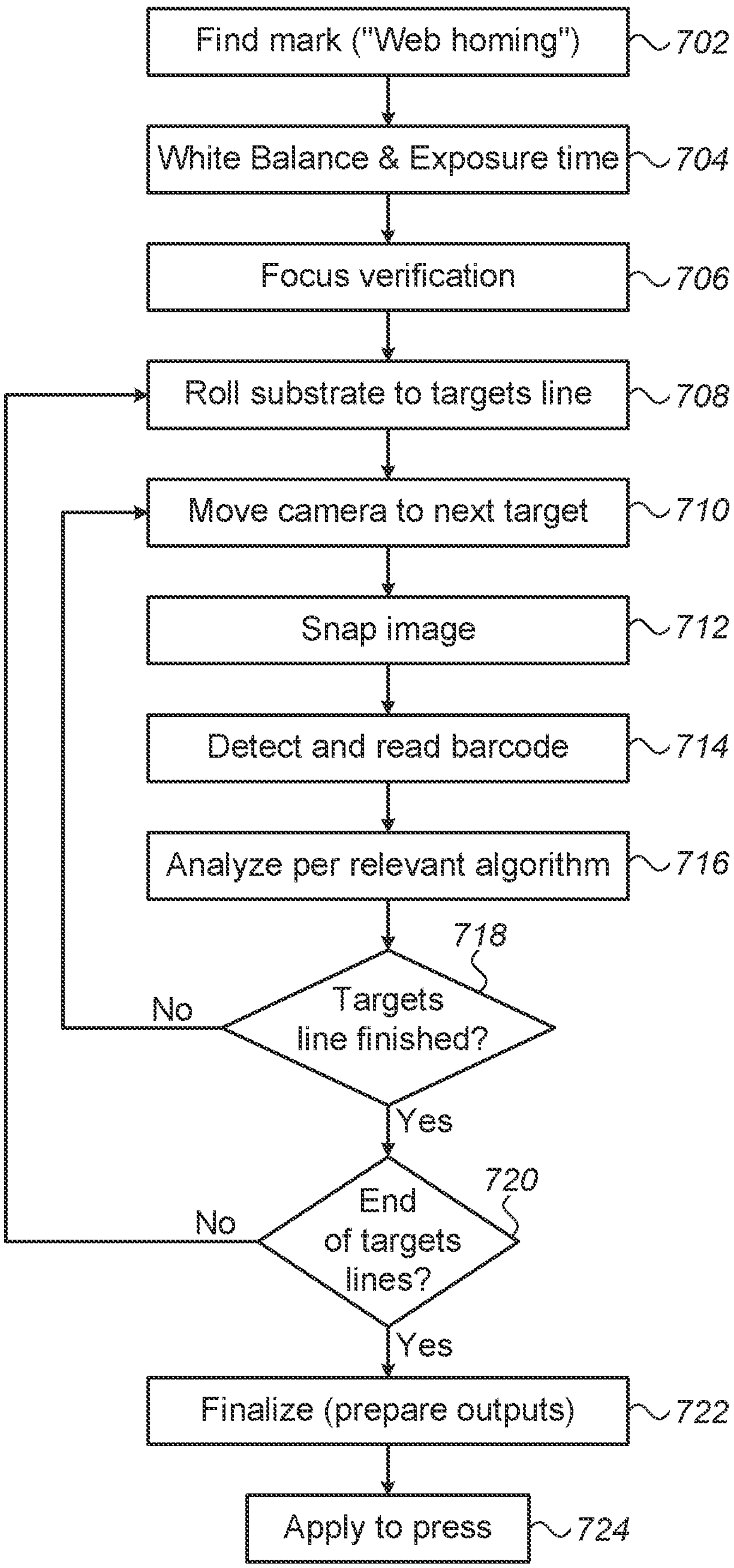
FIG. 7 is a flow chart that schematically illustrates a method for monitoring defects produced in digital printing on a continuous web substrate, in accordance with an embodiment of the present invention.

Detecting Defects and Distortions in a Pattern Printed on the Continuous Web Substrate FIG. 7 is a flow chart that schematically illustrates a method for detecting defects produced in digital printing on continuous target substrate 50, in accordance with an embodiment of the present invention. As described in FIG. 6 above, several types of process problems and defects may occur in continuous target substrate 50. For example, random defects, such as a particle or scratch on the surface or between layers of continuous target substrate 50, and systematic defects, such as a missing or blocked nozzle in one or more of print bars 62, misalignment between print heads, non-uniformity and other types of systematic defects. The term "systematic defect" refers to a defect that may occur due to a problem in system 10 and/or in the operation thereof. Thus, systematic defects may repeat in each printed image at specific locations and/or may have specific geometrical size and/or shape.

In some embodiments, the method of FIG. 7 targets to detect the systematic process problems and defects using various test structures and the marks described in FIG. 6 above. The method begins with positioning, between backlight module 210 and image sensor assembly 220, a given mark located at a selected section of continuous target substrate 50, at a web homing step 702. In some embodiments, the given mark defines the origin of a coordinate system of inspection station 200 on continuous target substrate 50.

At a calibration step 704, processor 34 moves continuous target substrate 50 and image sensor assembly 220, such that the camera of image sensor assembly 220 detects beams 208 from a pattern-free section of continuous target substrate 50. In some embodiments, processor applies white balance techniques to calibrate various parameters of inspection station 200, such as the exposure time, the RGB channels. In some embodiments, the pattern-free section is also used to compensate for optical imperfections such as lens vignetting correction.

As described in FIG. 6 above, processor 20 is configured to produce, in the digital image, different intensity (e.g., brightness) that are indicative, for example, of the density and/or thickness of the respective color of ink applied to surface 204 of continuous target substrate 50. For example, different gray levels are indicative of the density in the white ink applied to surface 204 of continuous target substrate 50. Similarly, an area having high density and/or a thick layer of the cyan ink, or of any other color, may appear in low intensity (e.g., dark color) in the digital image.

At a focus verification step 706, processor 20 measures the focus of inspection station 200 by testing the response of inspection station 200 to acquire and focus on a focus calibration target or any other suitable pattern of continuous target substrate 50. Focus calibration may also be carried out in lens and camera models supporting such operation.

At a substrate rolling step 708, processor 20 rolls continuous target substrate 50 in direction 99 to a target section, also referred to herein as a target line, which comprises one or more targets for testing process problems and systematic defects in continuous target substrate 50. For example, the target line may comprise an array of targets for detecting a missing nozzle in one or more print bars 62 of the black-color print bars. Another target line may comprise an array of targets for detecting a missing nozzle in one or more print bars 62 of the cyan-color print bars.

At a camera moving step 710, processor 20 moves the camera of image sensor assembly 220 in direction 206 so as to position the camera aligned with a test target of the testing scheme. For example, a target for testing whether there is a missing nozzle in print head number 9 of the black-color print bar.

In some embodiments, steps 308 and 310 may be carried out in a sequential mode. In these embodiments, processor 20 rolls continuous target substrate 50 in direction 99 to the section or array of targets. Subsequently, processor 20 stops rolling continuous target substrate 50 and starts moving the camera of image sensor assembly 220 in direction 206 so as to align the camera with the desired test target. These embodiments are also applicable for calibration step 704.

In other embodiments, steps 308 and 310 may be carried out in a simultaneous mode. In these embodiments, processor 20 rolls continuous target substrate 50 in direction 99 to the targets section, and at the same time, moves the camera of image sensor assembly 220 in direction 206 so as to align the camera with the test target. These embodiments are also applicable for calibration step 704.

In an embodiment, the simultaneous mode may be carried out also in production, when system 10 prints images on a product substrate rather than on a test substrate. In this embodiment, image forming station 60 produces test targets laid out between the product images, or at any other suitable location on continuous target substrate 50. During production of the printed image, processor 20 moves the camera of image sensor assembly 220 to the desired test target while rolling continuous target substrate 50 during the printing of images on the product substrate.

At an image acquisition step 712, processor 20 applies the camera to the aforementioned target so as to acquire an image thereof.

As described in FIG. 6 above, each target may have a mark, such as a barcode, which points to a registry in a look-up table (or any other type of file). At a barcode detection and reading step 714, processor 20 detects and reads the barcode.

In some embodiments, the barcode may describe the tested feature (e.g., a black-color nozzle of print head number 9) type of test (detection of a blocked nozzle) and algorithm to be applied to the acquired image.

In other embodiments, the method may exclude barcode detection and reading step 714 by replacing the barcode with any other suitable technique. For example, the information associated with a given tested feature may be set based on the position of the given target in the coordinate system of inspection station 200.

At an image analysis step 716, processor 20 applies to the image acquired by image sensor assembly 220, one or more algorithms corresponding to the test feature shown in the image. The algorithms analyze the image and processor 20 saves the results, for example, with an indicator of whether the black-color nozzle of print bar number 9 is functioning within the specification of system 10, or an alert in case this nozzle is partially or fully blocked.

At a target line decision step 718, processor 20 checks whether the target line has additional target, which are part of the testing scheme and were not visited yet. If there are additional targets to be test (e.g., black-color nozzle of print bar number 8) in the same target line, the method loops back to camera moving step 710 and processor 20 moves the camera of image sensor assembly 220 along direction 206 so as to position the camera above the next test target of the same target line and testing scheme.

After analyzing the last target in the target line, processor checks, at a scanning completion step 720, whether there are additional target lines in the testing scheme. In case there are additional target lines, the method loops back to substrate rolling step 708 and processor 20 rolls substrate to the next target line. For example, a target line comprising targets for testing cyan-color nozzles of print bars 62, and similar (or different) target lines for testing the nozzles of all other colors (e.g., yellow, magenta and white) of print bars 62.

After concluding the last target line, at a reporting step 722, processor 20 outputs a status report for each of the tested nozzles. The report summarizes the nozzles within the specification of system 10 and the malfunctioning nozzles and also generates correction files.

At an implementation step 724 that concludes the method, processor 20 applies the corrective actions to image forming station 60 and other stations and assemblies of system 10.

In other embodiments, the method of FIG. 7 may be applicable for monitoring and analyzing any other malfunctioning of one or more stations, modules and assemblies of system 10.

For example, the same method may be applied for monitoring print bar calibrations, such as mechanical alignment of print heads, and other problems and defects, such as but not limited to, printing non-uniformity and color registration errors.

Although the embodiments described herein mainly address digital printing on a continuous web substrate, the methods and systems described herein can also be used in other applications, such as in sheet fed printing inspection.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A digital printing system, comprising:

an intermediate transfer member (ITM), which is configured to receive a printing fluid so as to form an image;

a continuous target substrate having opposing first and second surfaces, and configured to engage with the ITM at an engagement point for receiving the image from the ITM, wherein, at the engagement point, the ITM is configured to move at a first velocity and the continuous target substrate is configured to move at a second velocity;

a light source, which is configured to illuminate the first surface of the continuous target substrate with light;

an image sensor assembly, configured to image at least a portion of the light transmitted through the continuous target substrate to the second surface, and to produce electrical signals in response to the imaged light; and a processor, which is configured to produce a digital image based on the electrical signals, and to estimate, based on the digital image, at least a distortion in the image.

2. The system according to claim 1, and comprising an electrical motor configured to move one or both of the ITM and the continuous target substrate.

3. The system according to claim 2, wherein the processor is configured to: (i) receive one or more measurements of an electrical current flowing through the electrical motor, (ii) evaluate a trend in the measured electrical current, and (iii) match the first velocity and the second velocity at the engagement point, based on the evaluated trend.

4. The system according to claim 3, and comprising first and second drums, wherein the first drum is configured to rotate at a first direction and first rotational velocity so as to move the ITM at the first velocity, and wherein the second drum is configured to rotate at a second direction and at a second rotational velocity so as to move the continuous target substrate at the second velocity, and wherein the processor is configured to engage and disengage between the ITM and the continuous target substrate at the engagement point by displacing one or both of the first drum and the second drum.

5. The system according to claim 1, wherein the processor is configured to estimate the distortion by analyzing one or more marks on the continuous target substrate.

6. The system according to claim 1, wherein the light source comprises a light diffuser.

7. The system according to claim 1, wherein the processor is configured to estimate at least the distortion in the image during production of the image.

8. The system according to claim 1, wherein the processor is configured to estimate at least a density of the printing fluid, by analyzing an intensity of the light transmitted through the continuous target substrate to the second surface.

9. The system according to claim 8, wherein the printing fluid comprises white ink.

10. The system according to claim 8, wherein the electrical signals are indicative of the intensity, and wherein the processor is configured to produce, in the digital image, gray levels indicative of the intensity.

11. A method, comprising:

receiving a printing fluid on an intermediate transfer member (ITM), so as to form an image;

engaging a continuous target substrate with the ITM at an engagement point for receiving the image from the ITM, the continuous target substrate has opposing first and second surfaces, and, at the engagement point, moving the ITM at a first velocity and moving the continuous target substrate at a second velocity;

illuminating the first surface of the continuous target substrate with light, and imaging, using an image sensor assembly, at least a portion of the light transmitted through the target substrate to the second surface, and producing electrical signals in response to the imaged light; and producing a digital image based on the electrical signals, and estimating, based on the digital image, at least a distortion in the image.

12. The method according to claim 11, and comprising moving one or both of the ITM and the target substrate using an electrical motor.

13. The method according to claim 12, and comprising: (i) receiving one or more measurements of an electrical current flowing through the electrical motor, (ii) evaluating a trend in the measured electrical current, and (iii) matching the first velocity and the second velocity at the engagement point, based on the evaluated trend.

14. The method according to claim 13, wherein moving one or both of the ITM and the target substrate comprises rotating a first drum at a first direction and first rotational velocity so as to move the ITM at the first velocity, and rotating a second drum at a second direction and at a second rotational velocity so as to move the continuous target substrate at the second velocity, and wherein the engaging comprises engaging and disengaging between the ITM and the continuous target substrate at the engagement point by displacing one or both of the first drum and the second drum.

15. The method according to claim 11, wherein estimating the distortion comprises analyzing one or more marks on the continuous target substrate.

16. The method according to claim 11, wherein illuminating the first surface with the light comprises illuminating using a light diffuser.

17. The method according to claim 11, wherein estimating at least the distortion in the image comprises estimating at least the distortion in the image during production of the image.

18. The method according to claim 11, and comprising estimating at least a density of the printing fluid, by analyzing an intensity of the light transmitted through the continuous target substrate to the second surface.

19. The method according to claim 18, wherein the printing fluid comprises white ink.

20. The method according to claim 18, wherein the electrical signals are indicative of the intensity, and comprising producing, in the digital image, gray levels indicative of the intensity.

* * * * *